Patented May 17, 1938

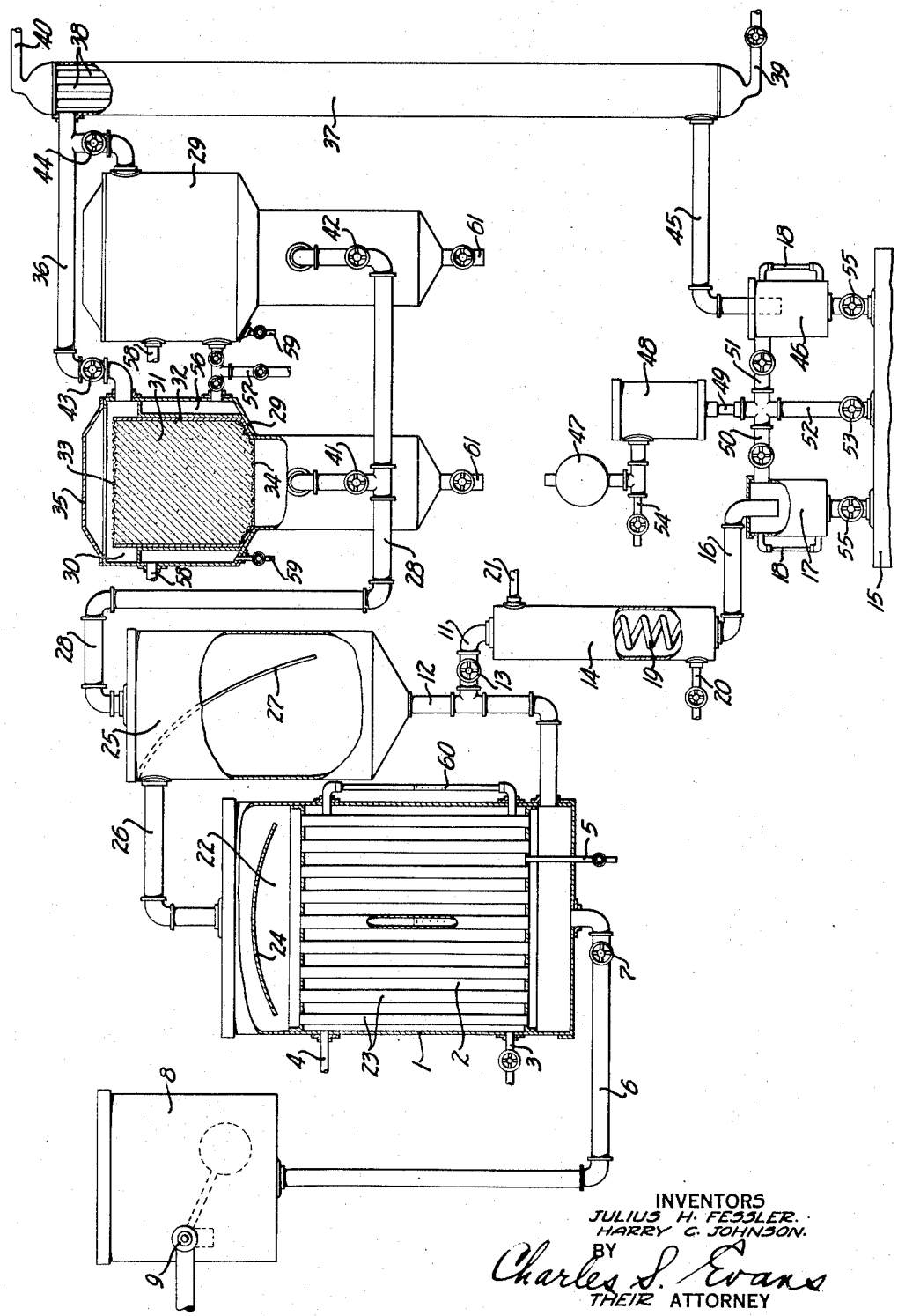

2,117,604

UNITED STATES PATENT OFFICE 2,117,604

PROCESS FOR TREATING LIQUIDS

Julius H. Fessler, Berkeley, and Harry C. Johnson, Davis, Calif., assignors of one-third to Mt. Diablo Wine Association, Emeryville, Calif., a corporation of California Application August 9, 1935, Serial No. 35,458

6 Claims. (Cl. 99—48)

Our invention relates to a process for treating wines and similar products containing an excessive amount of volatile acids, one of the objects being to remove the excess of volatile acid and bring the acid content of the wine within allowable limits without materially affecting the natural flavor, color, bouquet, body and other desired characteristics of the wine.

Another object is to provide a treatment for pasteurizing and deacidulating wines and similar products which may be carried on continuously, and which will permit the handling of large volumes of the product with a minimum of time and expense.

Another object is to provide a process and apparatus in which the treatment of wine products may be accurately controlled to conform to variations in the product to be treated and in the final limits to be satisfied.

The invention possesses other objects and features of advantage, some of which, with the foregoing, will be set forth in the following description of our invention. It is to be understood that we do not limit ourselves to this disclosure of species of our invention, as we may adopt variant embodiments thereof within the scope of the claims.

The drawing is a diagrammatic layout of an illustrative embodiment of our apparatus, parts being broken away and shown in vertical section.

In terms of broad inclusion, the process of our invention comprises heating wine under appropriate conditions of temperature and pressure, and for a sufficient period of time, to vaporize a portion of the wine including undesired volatile components of the wine, such as excess volatile acid. The vapors are passed into contact with a chemical reagent of a character adapted to remove the undesired components from the vapors; and unremoved vapors are then condensed and restored to the unevaporated portion of the wine after the heat treatment is completed. The heating treatment also serves to pasteurize the wine.

Broadly, the apparatus of our invention comprises a heating chamber in which the wine is heated, and an absorber unit through which the vapors from the heated wine are drawn. The absorber unit is provided with a medium, preferably a bed of small particles of a solid chemical reagent, adapted to absorb or combine with components of the vapors which it is desired to remove. A condenser is provided for condensing vapors not removed in the absorber unit, and a receiver is arranged to receive the condensed vapors and the unevaporated wine after it leaves the heating chamber. Preferably, means are provided for cooling the wine leaving the heating chamber, and for separating liquid from the wine vapors before the vapors enter the absorber unit.

Suitable means are provided for maintaining desired temperature and pressure conditions in the various portions of the apparatus; and means are provided for controlling the rate of flow and the proportion of the wine which is evaporated. Measuring means are provided for determining the amounts of condensed vapor and unevaporated wine delivered to the receiver whereby the ratio of the evaporated and unevaporated portions of the wine, and the composition of the final mixture, may be determined.

In terms of greater detail, the apparatus of our invention comprises a heating chamber 1 having a suitable heating unit 2, as for example a steam compartment having suitable valve controlled steam inlet and outlet connections 3 and 4 respectively. A drain 5 is provided for removing condensed steam from the unit 2.

The heating chamber 1 is provided with a supply inlet 6 controlled by a valve 7 and arranged to deliver wine into the chamber for heat treatment. The supply inlet is preferably connected to a supply chamber 8 in which a constant level of wine is maintained by means of a suitable float controlled valve 9 so that the wine will be delivered to the heating chamber 1 under a constant head.

An outlet 11 is connected into a stand pipe 12 mounted at one side of the heating chamber 1. The outlet 11 is provided with a valve 13 for controlling the flow of wine from the heating chamber. The outlet 11 communicates with a suitable cooling unit 14 which in turn is connected to a receiver 15 by means of a duct 16.

Preferably a measuring chamber 17 is interposed in the duct, and is provided with a gage glass 18 by which the rate at which wine is delivered to the receiver may be measured. The cooling unit 14 may be of any suitable character, as for example a chamber containing a coil 19 having a valve controlled inlet 20 and an outlet 21 through which cold water is circulated.

A vapor chamber 22 is provided at the top of the heating chamber 1 to receive vapors from the wine in the heating chamber. Preferably a plurality of tubes 23 are mounted to extend vertically through the heating unit 1, the bottoms of the tubes being open to admit wine supplied to the chamber 1, and the upper ends of the tubes opening into the vapor chamber 22 to deliver vapor from the wine into the vapor chamber. An arched baffle 24 is mounted in the vapor chamber 22 for intercepting particles of liquid carried by the vapors.

An expansion or separator chamber 25 is mounted adjacent the vapor chamber 22, vapor from the chamber 22 being conducted to the separator through a suitable duct 26 opening into the top thereof. A baffle 27 is mounted within the chamber 25 for intercepting particles of liquid which may be carried past the baffle 24. The lower end of the separator chamber 25 is connected to the stand pipe 12, so that liquid wine collecting in the chamber 25 drains into the stand pipe which in turn communicates with the bottom of the heating chamber 1.

A duct 28 connects the upper portion of the separator chamber with the bottom of an absorber unit 29 comprising a chamber 30 containing a chemical reagent 31 to remove from the vapor passing through the unit such components as it may be desired to eliminate.

For example, the component most commonly required to be removed from wine comprises volatile acids such as acetic, formic, propionic, butyric, valeric, and other volatile acids present to greater or lesser extent in most wines and similar products. For removing such acids, a chemical reagent capable of reacting with or absorbing the acid vapor is used. Sodium bicarbonate is particularly suited for such use; and for that purpose is preferably employed in the form of crystals, or in small granules, or compressed pellets, or in other finely divided form which will permit the passage of vapor through the interstices between the particles. Calcium hydroxide, sodium tetraborate ($Na_2B_4O_7$), the salts of any acid weaker than acetic acid, and alkaline reagents of any kind capable of reacting with the volatilized acid vapor, may be used in like manner.

The medium 31 is preferably contained in the receptacle 32 removably mounted in the chamber 30. A receptacle 32 fits snugly within an enlarged upper portion of the chamber 30. The top 33 and bottom 34 of the receptacle are formed of screen or other perforate material such that the vapors entering the lower portion of the unit through the duct 28 will move upwardly through the medium and pass off through the top of the receptacle.

The top of the unit 29 is closed by a suitable cover 35 through which the receptacle 32 may be removed and replaced when desired. The lower portion of the chamber 30 forms a receptacle for collecting liquid wine which may pass the separator 25, or which may condense and drip from the receptacle 32. A suitable drain 61 is provided for drawing off the wine so collected.

A duct 36 connects the upper portion of the chamber 32 with the top of a suitable condenser 37 for condensing vapor not removed by the medium 31. The condenser may be of any desired form, as for example a chamber cooled by a plurality of tubes 38 through which a flow of water or other cooling medium, is supplied through inlet and outlet connections 39 and 40. If desired, the incoming wine supplied to the heating chamber 1 may be used as the cooling medium; or two condensers may be used, the first cooled by wine and the second by water.

Preferably two absorber units 29 are provided and arranged for use selectively, suitable valve connections 41 and 42 being provided for directing the vapors from the duct 28 into a selected absorber unit 29 and excluding the vapors from the other unit. Valved connections 43 and 44 connect the duct 36 with the units and are operated to open the duct 36 from whichever unit 29 is in use, and to close it to the other. This permits either absorber unit 29 to be entirely shut off from the system so that the absorbing medium 31 thereof may be replaced or restored to condition for further use without interrupting the operation of the system as a whole.

The bottom of the condenser 37 is connected to the receiver 15 by a duct 45. A suitable measuring chamber 46, similar to the chamber 17 and having a similar gage glass 18, is preferably interposed in the duct 45 for measuring the rate at which condensed vapor is delivered therethrough to the receiver 15.

The receiver 15 may be of any size and character suitable for recombining the condensed vapors received from the condenser 37 with the unevaporated liquid received from the cooler 14.

A suitable suction pump 47 is provided for drawing the vapors from the heating chamber 1 through the separator 25, absorber unit 29, and condenser 37 and their connecting ducts; and to maintain a desired degree of vacuum above the liquid in the heating chamber. The pump is preferably connected to a spray collecting chamber 48 which in turn is connected to the measuring chambers 17 and 46 by means of a connection 49 communicating with valve controlled connections 50 and 51. The pump is also preferably connected to the receiver 15 by a connection 52 having a valve 53 so that, if desired, the receiver 15 may serve as a suction chamber as well as a receiver for the treated liquid.

A valve controlled by-pass 54 is preferably provided for opening the chamber 48 to the atmosphere so that liquid collecting in the chamber 48 may drain back into the receiver 15 or chambers 17 and 46. The by-pass 54 may also be used to control the degree of vacuum maintained in the system. The connection 49 is preferably made of glass to permit the presence of wine therein to be observed. Valves 55 are provided in the portions of the ducts 16 and 45 between the measuring chambers 17 and 46 and the receiver for closing said connections.

The amount of volatile acid allowable in a marketable wine is subject to strict regulation. For example, wines produced in California for sale in that State are allowed a maximum of .120 gram of volatile acid per 100 cc. in the case of dry red wines; and in the case of dry white wines and sweet wines, the maximum amount of volatile acid per 100 cc. of wine is fixed at .110 gram. Wines containing volatile acid in the excess of those limits are subject to condemnation. In spite of every precaution taken during the fermentation and ageing of wines, large volumes of wine are produced each year in which the acid content is so high as to render the wine unmarketable. The elimination of such excess acid has been successfully solved by our present invention.

In treating wines by the process of our invention, a stream of the wine to be treated is delivered into the heating chamber 1. The wine is delivered into the chamber 1 in any convenient manner, as by gravity or by suction developed by the pump 47, the operation of which creates a partial vacuum throughout the system. A partial vacuum in the chamber 1 corresponding to an absolute pressure of about 20 to 30 inches of mercury is preferred. The supply chamber 8 with its float controlled valve 9 insures that the wine will be supplied under a constant head; and the rate at which the wine is supplied into the chamber 1 may be accurately regulated by the valve 7 to maintain a desired constant rate of supply.

The wine is allowed to fill the chamber 1 to a point somewhat above the level of the liquid outlet connection 11 opening into the stand pipe 12. As the level of wine rises in the chamber 1, the lower ends of the tubes 23 are filled with the wine. Steam is introduced into the heating unit 2 to cause the wine to be quickly heated up to a desired temperature of about 50 to 60° C. depending upon the degree of vacuum maintained, the lower temperature range corresponding to the higher degree of vacuum. The temperature is maintained at a constant value by suitable regulation of the steam supplied to the heating unit 2; and the pressure in the chamber 1 is kept constant by regulating the pump 47.

The wine entering the tubes 23, being confined to relatively small columns surrounded by steam, is rapidly heated and a portion of the wine is evaporated, the vapors being drawn upwardly into the vapor chamber 22. This rapid heating of the wine under reduced pressure causes a substantial portion of the volatile acids to be vaporized and to pass upwardly into the vapor chamber 22 along with the other vapors given off from the wine. The baffle 24 intercepts particles of wine carried up into the chamber 22 with the vapors, causing the same to drain back into the chamber 1.

From the vapor chamber 22, the vapors are drawn through the separator 25 to remove further particles of wine which may be carried past the baffle 24; and from the separator, the vapors are drawn through an absorber unit 29. The liquid wine collecting in the separator drains back into the stand pipe 12 which is connected to the bottom of the chamber 1.

The vapors entering the absorber unit 29 pass upwardly through the medium 31 and are exposed to direct contact with the surface of the small particles of the reagent comprising the medium. The acid vapors react with the medium and are thereby removed from the volume of vapor passing through the unit 29. For example, when sodium bicarbonate is employed as the medium 31, acetic acid vapors react with the sodium bicarbonate to produce sodium acetate in which the acid vapors are held as a fixed salt. Other acid vapors react to produce corresponding salts, and similar reactions occur when other reagents are substituted for the sodium bicarbonate.

From the absorbing unit 29, the wine vapor, which is now substantially free of the acid component, is drawn through the duct 36 to the condenser 37 where it is condensed and delivered through the duct 45 and measuring chamber 46 to the receiver 15.

The reaction of the acid vapor with the sodium bicarbonate or other medium 31 causes the surfaces of the particles of the medium to become coated with the products formed by the reaction; and after a limited period of time it is necessary to replace the medium, or restore it to condition for further use. At that time, the unit 29 which has been in use is closed off from the system and the other unit is cut into the system by means of the valves 41, 42, 43, and 44 thereby permitting the process to continue without interruption.

Most of the acid carried by the wine vapor is acetic acid, and the sodium acetate formed by the reaction of the acetic acid vapor with the sodium bicarbonate is very much more soluble than the sodium bicarbonate itself. This permits the sodium bicarbonate to be restored to condition for further use by merely washing the medium with sufficient water to dissolve the acetate coating from the sodium bicarbonate particles. Sufficient fresh sodium bicarbonate is added to replace that consumed in service or lost in the washing operation.

In order to avoid condensation of the wine vapors in the absorber units 29, suitable heating means, such as a steam chamber 56, may be provided in the units to maintain the temperature of the vapors. Suitable valve controlled inlets 57 and outlets 58 are provided for circulating steam through the chambers 56. A drain 59 is provided for removing condensed steam.

While the wine vapors are being drawn through the absorber units 29 and condenser 37, a stream of unevaporated wine is allowed to flow from the heating chamber 1 through the outlet connection 11 to the receiver 15. The wine leaving the heating chamber 1 is preferably passed through the cooler 14 before delivery to the receiver.

The rate at which the unevaporated wine is delivered from the heating chamber 1 to the receiver 15 is regulated by means of the valve 13 to maintain a desired ratio to the amount of wine which is evaporated.

The rate at which the wine is delivered into the heating chamber 1 is regulated by the valve 7, and is varied in accordance with the amount of volatile acid which must be removed to bring the wine within allowable limits. For wines containing only a slight excess of volatile acids, only a small amount of the wine and volatile acid need be evaporated and the wine may be passed through the heating chamber at a relatively fast rate. Where higher percentages of acid are present, the rate at which the wine is passed through the heating chamber must be reduced to give a longer heating period and to permit the vaporizing of a correspondingly greater amount of the wine and acid. Ordinarily the rate is such as to cause the wine in the chamber 1 to be completely replaced in about one minute.

The amount of acid present in the wine to be treated is first determined by analysis. As the wine is vaporized, the vapor includes a substantial portion of the volatile acid present in the wine. The proportion of wine which is evaporated is regulated to maintain a ratio to the portion which is not evaporated whereby the volatile acid remaining in the wine leaving the heating chamber, when recombined with the condensed vapor restored to the wine after the removal of the acid component thereof by the absorber units 29, will give a desired acid content in the final product. This ratio is initially determined by analysis of the unvaporized wine leaving the heating chamber, and calculating the amount of acid free condensed vapor which must be restored to the unvaporized wine to give the desired acid content in the mixture. The ratio may also be obtained by testing the final mixture at frequent intervals and varying the ratio until the desired acidity is produced.

The valve 13 is then regulated so that the flow of unvaporized wine from the heating chamber 1 through the outlet connection 11, plus the amount of wine vaporized and drawn through the absorber unit 29, equals the amount of wine entering the chamber 1. A suitable gage glass 60 is mounted in connection with the chamber 1 to show the level of the wine therein. When correctly regulated the level of the wine will remain constant at a point slightly above the level of the outlet 11. Once the several valves are set for a particular grade of wine, the process may be carried on continuously with little or no further regulation other than the supervision necessary to see that the temperature and pressure conditions within the heating chamber 1 are kept substantially constant.

The proportion of the initial wine product which must be evaporated in order to obtain a final product having a desired acid content may be readily determined for various types and grades in the manner above described. Thereafter, it is only necessary to measure the amounts of unevaporated wine and condensed vapors delivered to the measuring chambers 17 and 46 respectively in order to adjust the apparatus to obtain the desired ratio. For this purpose, the valves 55 are closed so as to retain in the chambers 17 and 46 the wine and condensed vapor delivered thereto. The amounts of wine and condensed vapors collected in the measuring chambers 17 and 46 during a definite period of time may be observed by means of the gage glasses 18 and will indicate the ratio which the condensed vapor bears to the unvaporized portion of the wine. Appropriate regulation of the valves 7 and 13 may then be made to vary the ratio as desired. After the desired ratio is obtained, the valves are again opened to permit the flow of treated wine and condensed vapor to the receiver.

A substantial part of the wine flows to the receiver, 15 without being vaporized in the heating chamber 1, and the vaporized portion of the wine is restored to the treated wine substantially unaltered except for the removal of the acid component. The final mixture therefore retains the desirable qualities of the wine; and the original flavor, color, bouquet, and other characteristics of the wine will be substantially the same as before the treatment. Wines which are unmarketable because of an excessive content of volatile acid may thus be reclaimed by treatment in accordance with our invention.

In addition to removing the excess acid, our process also serves to pasteurize the wine. Thus many molds, yeasts, and organisms of various kinds, are destroyed or rendered inactive by the heat to which the wine is subjected. By destroying such organisms, the quality of the wine is improved; and the treated wine is less subject to spoilage.

The term wine, as herein used, includes grape wine, fruit wine, berry wine, and similar wine-like beverages. While the process and apparatus of our invention is directed particularly to the treatment of such wine and wine-like products, it is of course capable of broader application in the treatment of other liquids containing water, alcohol, flavoring matter and undesired components such as acid, or to any liquid mixture containing a volatile component which it is desired to remove without materially affecting the flavor and other desired characteristics of the liquid.

We claim:

1. The process of removing acid from wine which comprises passing a continuous supply of the wine into a heating chamber to vaporize a portion thereof including volatile acid, separately removing the vaporized and unvaporized portions of the wine from the chamber, passing the vapor from the wine into contact with a granular chemical reagent for removing the acid portion of the vapor, condensing the remainder of the vapor, and restoring the condensed vapor to the unvaporized portion of the wine.

2. The process of removing acid from wine which comprises heating the wine to vaporize a portion thereof including volatile acid, passing the vapor from the wine into contact with sodium bicarbonate for removing the acid portion of the vapor, condensing the remainder of the vapor, and restoring the condensed vapor to the unvaporized portion of the wine.

3. The process of pasteurizing and deacidulating wine which comprises heating a continuous supply of the wine to vaporize a portion thereof including volatile acid therein, controlling the ratio of the vaporized and unvaporized portions of the wine, passing the vapor into contact with a granular acid removing reagent, condensing the vapor not removed by the reagent, and restoring the condensed vapor to the unevaporated portion of the wine.

4. The process of pasteurizing and deacidulating wine which comprises passing a continuous stream of wine through a heating chamber to vaporize a portion of the wine including volatile acid to be removed from the wine, passing the vapor into contact with a granular reagent for removing substantially all of the acid component of the vapor, condensing vapor not removed by the reagent, and restoring condensed vapor to the wine leaving the heating chamber.

5. The process of pasteurizing and deacidulating wine which comprises passing a continuous stream of wine through a heating chamber at a temperature of about 50° to 60° C. and an absolute pressure of about 20 to 30 inches of mercury to vaporize a portion of the wine including volatile acid to be removed from the wine, passing the vapor into contact with a granular acid removing reagent, condensing vapor not removed by the reagent, and restoring the condensed vapor to the wine leaving the heating chamber.

6. The process of removing acid from wine which comprises passing a continuous stream of wine through a heating chamber to vaporize a predetermined portion of the wine including volatile acid, passing the vapor into contact with a granular acid removing agent, condensing vapor not removed by the reagent, and restoring the condensed vapor to the unevaporated wine leaving the heating chamber.

JULIUS H. FESSLER.
HARRY C. JOHNSON.